(12) United States Patent
Hamel et al.

(10) Patent No.: US 10,031,559 B1
(45) Date of Patent: Jul. 24, 2018

(54) SWITCHABLE MAGNETIC ARRAY

(71) Applicant: Apple Inc., Cupertino, CA (US)

(72) Inventors: Bradley J. Hamel, Redwood City, CA (US); Christiaan A. Ligtenberg, San Carlos, CA (US); John C. Difonzo, Emerald Hills, CA (US); Jean-Marc Gery, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/269,875

(22) Filed: Sep. 19, 2016

(51) Int. Cl.
| | |
|---|---|
| *H01H 9/00* | (2006.01) |
| *G06F 1/16* | (2006.01) |
| *H01F 7/06* | (2006.01) |
| *H01F 1/03* | (2006.01) |

(52) U.S. Cl.
CPC .......... *G06F 1/1679* (2013.01); *G06F 1/1616* (2013.01); *H01F 1/0306* (2013.01); *H01F 7/06* (2013.01)

(58) Field of Classification Search
CPC .............. G06F 1/1616; G06F 1/1679; H01F 3/10–3/14; H01F 7/0242; H01F 7/0252; H01F 7/0263; H01F 7/04; E05B 47/0038
USPC .......................................................... 335/206
See application file for complete search history.

(56) References Cited

U.S. PATENT DOCUMENTS

| | | | | |
|---|---|---|---|---|
| 5,861,088 A * | 1/1999 | Curtins | ............... | H01J 37/3408 204/298.03 |
| 8,928,437 B2 * | 1/2015 | Lauder | ................... | G06F 1/1626 206/320 |
| 8,994,483 B2 * | 3/2015 | Dupraz | ................... | H02K 33/00 335/229 |
| 9,665,125 B2 * | 5/2017 | Browning | ............. | G06F 1/1632 |
| 9,728,360 B2 * | 8/2017 | Birner | ................... | H01H 51/065 |
| 2002/0118856 A1 * | 8/2002 | Croft, III | ................. | H04R 7/22 381/412 |
| 2003/0234711 A1 * | 12/2003 | Bernstein | ........... | G02B 26/0841 335/296 |
| 2004/0056651 A1 * | 3/2004 | Marietta Bersana | .. | G01D 5/145 324/207.2 |
| 2006/0226726 A1 * | 10/2006 | Shim | .................... | H02K 7/1853 310/166 |
| 2008/0148988 A1 * | 6/2008 | Wamble | .................. | E01B 25/26 104/130.02 |
| 2010/0302199 A1 * | 12/2010 | Taylor | ..................... | G06F 3/046 345/174 |
| 2012/0066865 A1 * | 3/2012 | Lauder | .................. | G06F 1/1626 16/382 |

(Continued)

*Primary Examiner* — Shawki S Ismail
*Assistant Examiner* — Lisa Homza
(74) *Attorney, Agent, or Firm* — Dickinson Wright RLLP

(57) ABSTRACT

An electronic device (such as a laptop) may selectively latch a base to a lid using a switchable magnet array. In particular, a drive circuit in the electronic device may apply at least a current pulse to a conductor that generates a magnetic field to reverse a direction of a remnant magnetization in the switchable magnet array. By reversing the direction of the remnant magnetization, the electronic device may selectively increase or decrease a magnetic field generated by the switchable magnet array at an attraction plate in the electronic device. This magnetic field may, in turn, result in an attractive force between the switchable magnet array and the attraction plate, thereby selectively latching the base and the lid when the base and the lid are proximate to each other.

19 Claims, 10 Drawing Sheets

(56) References Cited

U.S. PATENT DOCUMENTS

| | | | | |
|---|---|---|---|---|
| 2012/0066873 A1* | 3/2012 | Lauder | G06F 1/1647 24/303 |
| 2012/0068797 A1* | 3/2012 | Lauder | G06F 1/1647 335/285 |
| 2012/0068919 A1* | 3/2012 | Lauder | G06F 1/1626 345/156 |
| 2012/0069502 A1* | 3/2012 | Lauder | H01F 7/04 361/679.01 |
| 2012/0069503 A1* | 3/2012 | Lauder | G06F 1/1626 361/679.01 |
| 2012/0211990 A1* | 8/2012 | Davey | F03B 13/264 290/54 |
| 2012/0319518 A1* | 12/2012 | Rapoport | H02K 1/2793 310/156.12 |
| 2013/0176091 A1* | 7/2013 | Lancaster-Larocque | G06F 1/1616 335/306 |
| 2014/0043121 A1* | 2/2014 | Sartee | G06F 1/16 335/219 |
| 2014/0306064 A1* | 10/2014 | Palmer | B64G 1/402 244/171.1 |
| 2015/0277491 A1* | 10/2015 | Browning | G06F 1/1632 361/679.44 |
| 2016/0064129 A1* | 3/2016 | Gluskin | H01F 7/0231 335/306 |
| 2016/0315511 A1* | 10/2016 | Rivellini | H02K 7/063 |
| 2017/0017273 A1* | 1/2017 | Weldon | G06F 1/1654 |
| 2017/0158356 A1* | 6/2017 | Palmer | B64G 1/002 |
| 2017/0199469 A1* | 7/2017 | Dams | G03F 7/70758 |
| 2017/0207691 A1* | 7/2017 | Hemati | H02K 41/0354 |
| 2017/0317569 A1* | 11/2017 | Lu | H02K 41/031 |

* cited by examiner

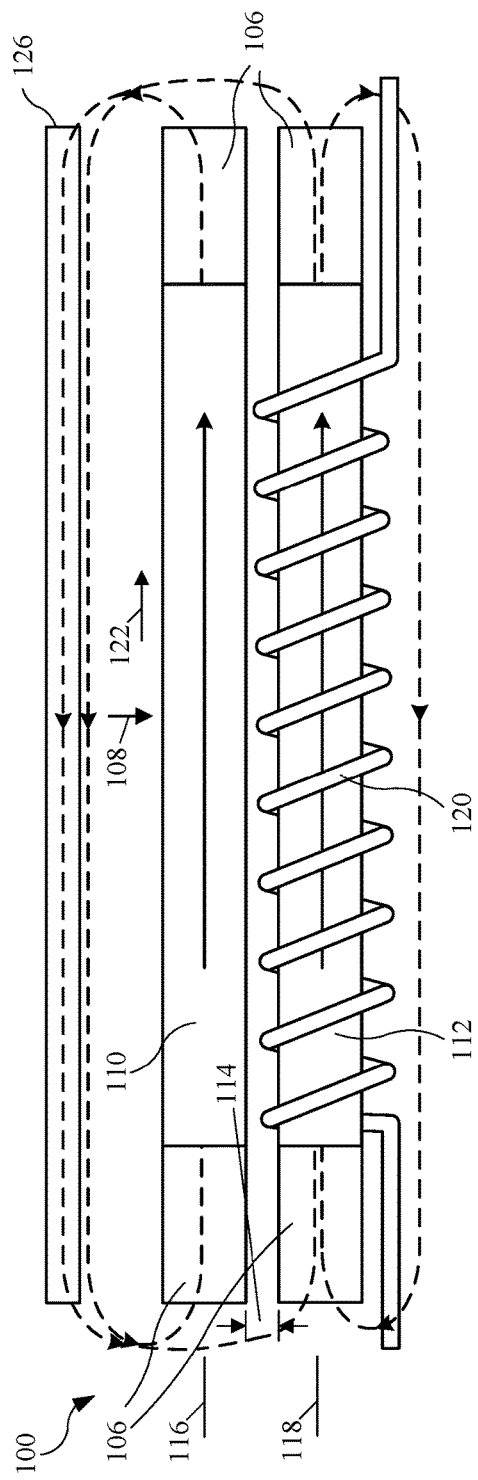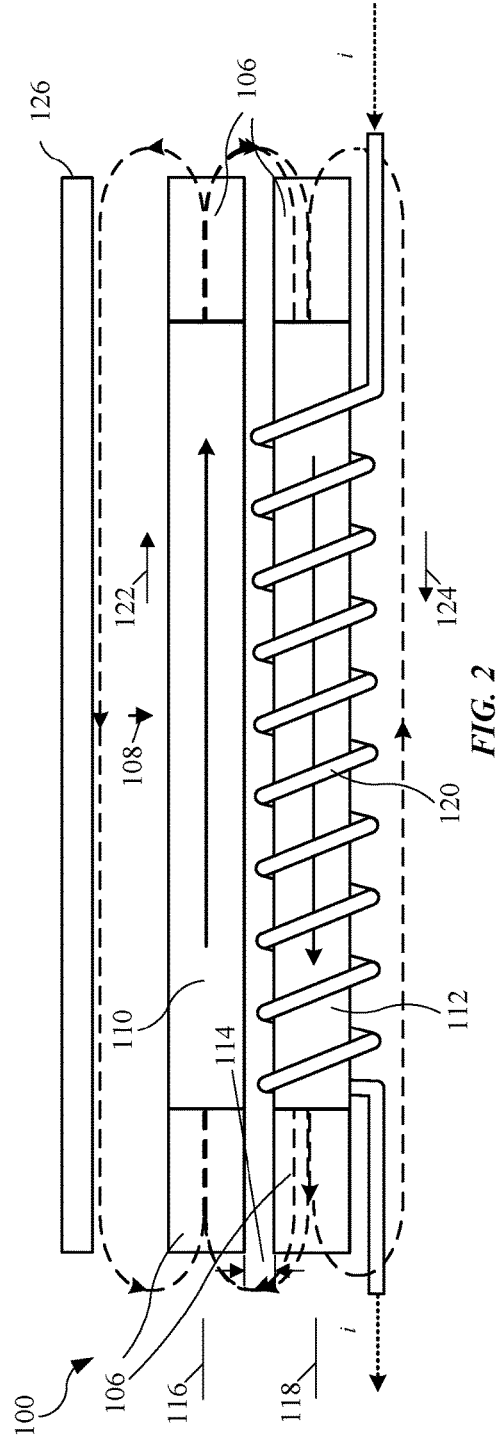

SWITCHABLE MAGNETIC ARRAY

FIELD

The following description relates to switchable magnet arrays, including a switchable magnetic array in an electronic device that selectively latches components in the electronic device.

BACKGROUND

Permanent magnets are often used as latches to mechanically couple components in devices. For example, permanent magnets can be included in a portable electronic device, such as a laptop computer (which is sometimes referred to as a 'laptop'), to latch a lid to a base. In particular, permanent magnets may be included in the lid and the base. When the lid is proximate to the base, the permanent magnets may provide an attractive force that latches the lid to the base without consuming any power.

However, as the form factor in laptops is decreased, there may be less room for the permanent magnets. Consequently, the area and/or the thickness of the permanent magnets may need to be decreased. This may reduce the attractive force between the permanent magnets and the electromagnet, which may make the permanent magnets and the electromagnets less effective as a latch.

One approach for addressing this challenge is to increase the remnant magnetization of the permanent magnets. However, a larger remnant magnetization may increase the risk that the permanent magnets inadvertently damage components or devices that are sensitive to strong magnetic fields, such as credit cards. Because it is typically difficult to reduce or turn off the magnetic field provided by permanent magnets, the use of permanent magnets as latches in laptops may be less desirable.

In principle, electromagnets can be used to selectively provide magnetic fields and, thus, to latch the lid to the base. However, in practice, electromagnets consume considerable power and generate heat, neither of which is desirable in portable electronic devices such as laptops.

SUMMARY

Some embodiments relate to an electronic device (such as a laptop) that includes a switchable magnet array is described. In particular, the electronic device may include a base that is rotatably coupled to a lid. Moreover, the electronic device may include a drive circuit, the base may include the switchable magnet array, and the lid may include an attraction plate. The switchable magnet array may include a first magnetic layer and a second magnetic layer separated by a gap. Furthermore, the first magnetic layer may include a first magnetic material having a first coercivity and that has a first remnant magnetization approximately in a plane of the first magnetic layer. The second magnetic layer may include a second magnetic material having a second coercivity and that has a second remnant magnetization approximately in a plane of the second magnetic layer. Additionally, the switchable magnet array may include a conductor proximate to the second magnetic layer. By applying at least a current pulse to the conductor using the drive circuit, a direction of the second remnant magnetization may be selectively reversed, thereby selectively providing an attractive force with the attraction plate to latch the lid and the base when the lid and the base are in proximity to each other.

Note that the conductor may include a coil that, at least in part, surrounds the second magnetic layer.

Moreover, when the second remnant magnetization is in a same direction as the first remnant magnetization, the attractive force at the attraction plate is greater than a threshold value. Alternatively, when the second remnant magnetization is in an opposite direction as the first remnant magnetization, the attractive force at the attraction plate is less than the threshold value.

Furthermore, the first magnetic material may include neodymium iron boron (NdFeCo), and the second magnetic material may include an alloy of aluminum, nickel and cobalt, such as AlNiCo5. The attraction plate may include iron or iron cobalt (FeCo).

Additionally, the first magnetic material in the first magnetic layer and the second magnetic material in the second magnetic layer may be divided into segments. These segments may be separated by another magnetic material, such as iron.

In some embodiments, the gap has a predefined value based on the first magnetic material, the second magnetic material and a geometry of the switchable magnet array.

Other embodiments provide an electronic device with a switchable magnet array, such as a switchable Halbach array. In particular, the electronic device may include a base that is rotatably coupled to a lid. Moreover, the electronic device may include a drive circuit, the base may include the switchable magnet array, and the lid may include an attraction plate. The switchable magnet array may include a first magnetic element, a second magnetic element and a third magnetic element between the first magnetic element and the second magnetic element. Furthermore, the first magnetic element may include a first magnetic material having a first coercivity and that has a first remnant magnetization approximately perpendicular to a plane of the switchable magnet array. The second magnetic element may include the first magnetic material having a second remnant magnetization approximately perpendicular to the plane of the switchable magnet array but in an opposite direction from the first remnant magnetization. Additionally, the third magnetic element may include a second magnetic material having a second coercivity and a third remnant magnetization that is in the plane of the switchable magnet array. The switchable magnet array may include a conductor proximate to the third magnetic element. By applying at least a current pulse to the conductor using the drive circuit, a direction of the third remnant magnetization may be selectively reversed, thereby selectively providing an attractive force with the attraction plate to latch the lid and the base when the lid and the base are in proximity to each other.

Note that the conductor may include a coil that, at least in part, surrounds the third magnetic element.

Moreover, when the third remnant magnetization is in a first direction, the attractive force at the attraction plate is greater than a threshold value. Alternatively, when the third remnant magnetization is in an opposite direction to the first direction, the attractive force at the attraction plate is less than the threshold value.

Furthermore, the first magnetic material may include neodymium iron boron (NdFeCo), and the second magnetic material may include an alloy of aluminum, nickel and cobalt, such as AlNiCo5. The attraction plate may include iron or iron cobalt (FeCo).

Additionally, the second magnetic material in the third magnetic element may be divided into segments. These segments may be separated by additional, alternating instances of the first magnetic element and the second magnetic element.

In some embodiments, the third magnetic element includes two layers having different coercivities.

Moreover, the switchable magnet array may include a magnetic shunt proximate to the third magnetic element.

Other embodiments provide the electronic device with the switchable magnet array in the lid and the attraction plate in the base.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 1 is a drawing of an example of a switchable magnet array.

FIG. 2 is a drawing of an example of the switchable magnet array of FIG. 1.

Note that like reference numerals refer to corresponding parts throughout the drawings. Moreover, multiple instances of the same part are designated by a common prefix separated from an instance number by a dash.

DETAILED DESCRIPTION

Figure 3:
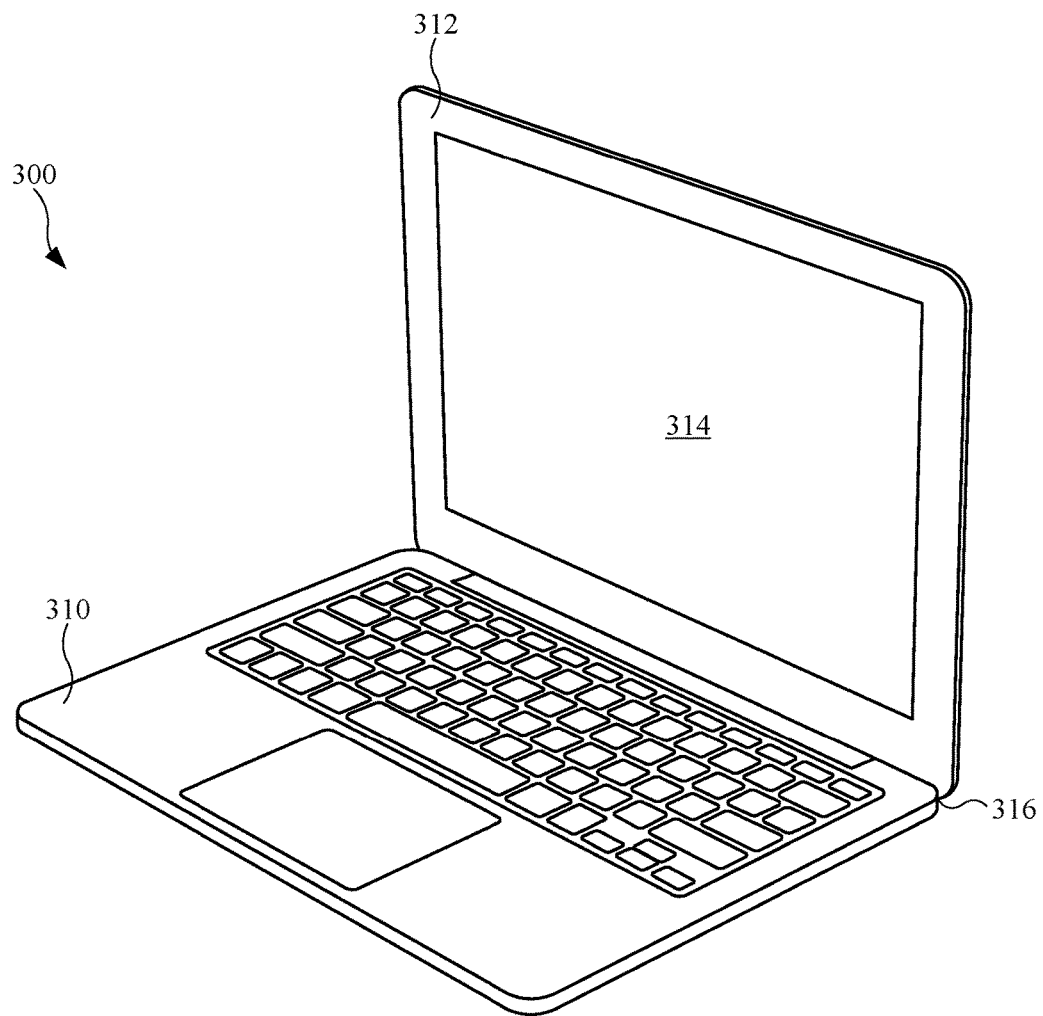
FIG. 3 is an example of a drawing of laptop.

An electronic device (such as a laptop) may selectively latch a base to a lid using a switchable magnet array. In particular, a drive circuit in the electronic device may apply at least a current pulse to a conductor that generates a magnetic field to reverse a direction of a remnant magnetization in the switchable magnet array. By reversing the direction of the remnant magnetization, the electronic device may selectively increase or decrease a magnetic field generated by the switchable magnet array at an attraction plate in the electronic device. This magnetic field may, in turn, result in an attractive force between the switchable magnet array and the attraction plate, thereby selectively latching the base and the lid when the base and the lid are proximate to each other.

By allowing the magnetic field produced by the switchable magnet array to be selectively changed, this latching technique may provide a compact, low-power technique for latching components (such as the base and the lid) in the electronic device without, at other times, inadvertently damaging components or devices (such as credit cards) that are sensitive to magnetic fields. Consequently, the latching technique may improve the power consumption of the electronic device, while reducing the complexity and size of the electronic device, which may improve the user experience.

In the discussion that follows, the laptop is used as an illustration of the electronic device. However, the switchable magnet array may be used in a variety of applications to selectively provide an attractive force that latches components to each other and, more generally, to selectively provide or generate a magnetic field external to the switchable magnet array.

We now describe the latching technique. FIG. 1 presents a drawing of an example of a switchable magnet array 100. In particular, switchable magnet array 100 may include magnetic layer 110 and a magnetic layer 112, which are separated by a gap 114, and magnetic pole piece 106 (such as soft iron). Furthermore, magnetic layer 110 may include a first magnetic material having a first coercivity and a first remnant magnetization approximately in a plane 116 of magnetic layer 110. Magnetic layer 112 may include a second magnetic material having a second coercivity (which may be the same or different from the first coercivity) and that has a second remnant magnetization approximately in a plane 118 of magnetic layer 112. In some embodiments, magnetic layer 110 has a high coercivity (such as 1.1-1.2 T or 2.5-2.7 T) and magnetic layer 112 has a low coercivity (such as 0.06-0.12 T). Note that a magnetic element, such as a remnant magnetization, may have a north-facing polarity or a 'North Pole,' and a south-facing polarity or a 'South Pole.' As shown in FIG. 1, and throughout this detailed description, an arrow is superimposed on the magnetic elements and points in a direction toward the North Pole of the magnetic elements. Also, a magnetic element may generate an external magnetic field pointing from the North Pole to the South Pole.

Additionally, switchable magnet array 100 may include a conductor proximate to magnetic layer 112. For example, the conductor may include an electrically conductive material, such as a metal. As illustrated in FIG. 1, the conductor may include a coil 120 (such as a solenoid coil) that, at least in part, surrounds or encloses magnetic layer 112. However, in other embodiments the conductor may include a conductive layer that is adjacent and proximate to magnetic layer 112.

When the second remnant magnetization is in a same direction 122 as the first remnant magnetization, more magnetic flux is output by switchable magnet array 100, which results in a larger magnetic field at attraction plate 126 (illustrated by the dashed field lines in FIG. 1). In turn, this results in an attractive force 108 greater than a threshold value (such as 1 N) between attraction plate 126 and switchable magnet array 100. Alternatively, because the second magnetic material has a lower second coercivity, the direction or polarity of the second remnant magnetization may be selectively reversed. This is shown in FIG. 2, which presents a drawing of another state of switchable magnet array 100. In particular, by applying at least a current pulse to coil 120 using drive circuit 320 (FIG. 4), a direction 124 of the second remnant magnetization may be selectively reversed so that it is opposite to direction 122 of the first remnant magnetization, thereby providing attractive force 108 that is less than the threshold value between attraction plate 126 and switchable magnet array 100. In some embodiments, the current pulse has a duration between several microseconds to several milliseconds (such as, e.g. 2-10 µs), and a current magnitude of 30-50 A with a 30 turn coil 120.

In some embodiments, the first magnetic material includes neodymium iron boron (NdFeCo), and the second magnetic material includes an alloy of aluminum, nickel and cobalt, such as AlNiCo5 (which is sometimes referred to as 'AlNiCo'). Moreover, attraction plate 126 may include iron or iron cobalt (FeCo). More generally, attraction plate 126 may include a soft magnetic material. However, a wide variety of magnetic materials may be used, including: an alloy of neodymium iron boron, an alloy of samarium cobalt, an alloy of samarium cobalt iron copper zinc, an alloy of samarium ferrite, a magnetic material that includes a rare-earth element, etc.

Note that the first magnetic material in magnetic layer 110 and the second magnetic material in magnetic layer 112 may be divided into segments. These segments may be separated by another magnetic material, such as soft magnetic material (e.g., iron), which provide pole pieces. In particular, the first and second remnant magnetizations may be approximately at right angles to attractive force 108. Furthermore, the pole pieces may redirect the magnetic flux towards attraction plate 126. As shown in FIGS. 1 and 2, gap 114 may extend through the pole pieces.

Furthermore, in some embodiments gap 114 has a predefined value based on the magnetic materials and the geometry to increase a reluctance in the corresponding magnetic circuit. For example, gap 114 may be 1-2 mm. In the absence of gap 114, the first magnetic material may immediately reverse the polarity of the second magnetic material, thereby turning switchable magnet array 100 'off.' Consequently, gap 114 may prevent the magnetic field from the first magnetic material from reversing the direction of the second magnetic material.

For example, the first magnetic material may include a magnetic material that includes neodymium, the second magnetic material may include AlNiCo5, and attraction plate 126 may include soft iron. Moreover, switchable magnet array 100 may be 30 mm long, attraction plate 126 may have a thickness of 0.5-1 mm, gap 114 may be 0.3 mm wide and the pole pieces may have a width of 0.85 mm. Furthermore, magnetic layer 110, magnetic layer 112 and attraction plate 126 may each have a thickness of approximately 1 mm. Note that attractive force 108 between switchable magnet array 100 and attraction plate 126 may vary between 0.4 N when the first and the second remnant magnetizations point in directions 122 and 124, respectively, to 3.5 N when the first and the second remnant magnetizations point in direction 122. However, these numerical values are only for purposes of illustration. In other embodiments, different numerical values may be used.

In some embodiments, attractive force 108 may be non-zero in the 'off' state of switchable magnet array 100. Consequently, gap 114 and a gap between attraction plate 126 and magnetic layer 110 may need to be large enough to provide both the 'on' force and a large ratio of attractive force 108 in the 'on' and 'off' states.

We now describe embodiments of a laptop that includes a switchable magnet array. This is shown in FIG. 3, which presents a drawing of laptop 300 that includes a base 310 and a lid 312, which includes a display 314. Base 310 and lid 312 are rotatably coupled by a barrel hinge 316, so lid 312 can be positioned with an orientation anywhere from approximately perpendicular to a plane of base 310 (an 'open' position) to approximately parallel to the plane of base 310 (a 'closed' position). When lid 312 is in the closed position, it is often desirable to have lid 312 and base 310 latched together, so lid 312 does not inadvertently or unintentionally move away from base 310.

One approach for latching base 310 and lid 312 is based on magnets (such as permanent magnets) in base 310 and/or lid 312. For example, magnets may be placed on an inner surface of lid 312 and an attraction plate (such as a soft magnetic material) may be included in base 310.

However, as described previously, as the form factor of laptop 300 changes (and, in particular, as lid 312 is made thinner) it may be difficult to find sufficient room for magnets in lid 312. If the positions of the magnets and the attraction plate are reversed, so the magnets are in base 310, the magnetic fields from the magnets may inadvertently damage components or devices that are sensitive to magnetic fields (such as credit or debit cards) when lid 312 is in the open position.

Figure 4:
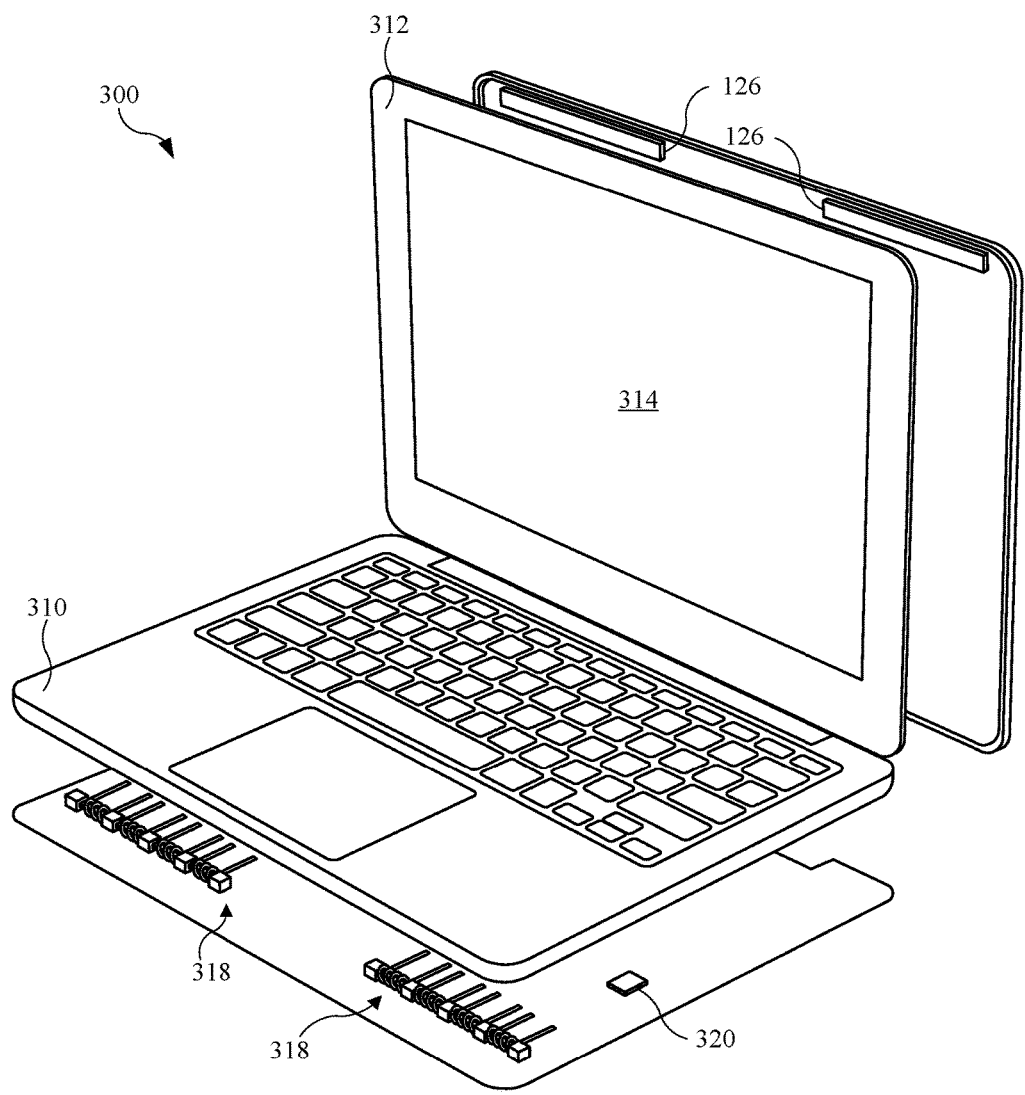
FIG. 4 is a drawing of an example of switchable magnet arrays in the laptop of FIG. 3.

In order to address this challenge, base 310 may include a switchable magnet array so that the external magnetic field produced or provided by the switchable magnet array can be selectively changed depending on whether lid 312 is in the open or the closed position. This is shown in FIG. 4, which provides an illustration of switchable magnet arrays 318 in an exploded view of laptop 300. During operation, drive circuit 320 in base 310 may selectively provide at least a current pulse to switchable magnet arrays 318 to change a magnetic field produced or provided by switchable magnet arrays 318. For example, when lid 312 is in the open position, in response to at least the current pulse, switchable magnet arrays 318 may produce a smaller external magnetic field, so components and devices that are sensitive to external magnetic fields are not inadvertently damaged. Moreover, when lid 312 is in the closed position, in response to a current pulse of the opposite polarity, switchable magnet arrays 318 may produce a larger external magnetic field. This external magnetic field may produce an attractive force between attraction plates 126 in lid 312 and switchable magnet arrays 318 so that base 310 and lid 312 are latched together. Note that attraction plates 126 may spatially overlap with switchable magnet arrays 318 when lid 312 is in the closed position. In particular, the attractive force may latch base 310 and lid 312 may be latched together when base 310 and lid 312 are proximate to each other, such as when a plane of lid 312 is, e.g. within 5-20° of a plane of base 310. However, these are illustrative values, and the attractive force may be sufficient to latch base 310 and lid 312 are other angles between planes of base 310 and lid 312.

While FIGS. 3 and 4 illustrate laptop 300 with particular components, in other embodiments laptop 300 may include fewer components or additional components. For example, laptop 300 may include a single instance of switchable magnet array and an attraction plate.

Moreover, two or components may be combined into a single component, and/or a position of one or more components may be changed. For example, in some embodiments switchable magnet arrays 318 are included in lid 312 and attraction plates 126 are included in base 310.

While FIGS. 1 and 2 illustrate a particular configuration of the switchable magnet array, as described below with reference to FIGS. 5-13, a variety of components may be used to implement switchable magnet arrays 318. For example, other embodiments of switchable magnet arrays 318 in FIG. 1 may include switchable Halbach arrays. In these embodiments, the polarity of a low coercivity magnetic material may be switched or flipped in the switchable Halbach arrays in order to turn the switchable Halbach arrays 'on' and 'off,' and more generally to change the external magnetic field generated or provided by the switchable Halbach arrays.

Figure 5:
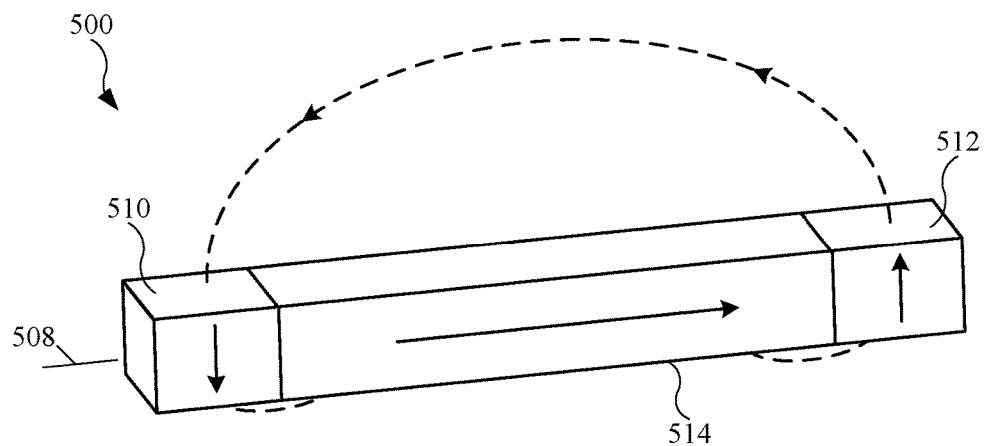
FIG. 5 is a drawing of an example of a switchable Halbach array.

FIG. 5 presents a drawing of an example of a switchable Halbach array 500. Switchable Halbach array 500 may include: a magnetic element 510 that includes the first magnetic material (such as neodymium, e.g., with a coercivity between 1.1-1.2 T or 25-2.7 T), a magnetic element 512 that includes the first magnetic material, and a magnetic element 514 positioned between magnetic element 510 and magnetic element 512 that includes the second magnetic material (such as AlNiCo, e.g., with a coercivity between 0.06-0.12 T, or neodymium iron boron or NdFeB). In some embodiments, magnetic element 514 is divided into segments that additional instances of magnetic elements 510 and 512 in an alternating spatial pattern. In particular, a first and a second segments of magnetic element 514 may be separated by an instance of magnetic element 510, and then the second segment of magnetic element 514 may be separated from a third segment of magnetic element 514 by an instance of magnetic element 512 in an alternating spatial pattern.

As shown in FIG. 5, magnetic element 510, magnetic element 512, and magnetic element 514 may be aligned with one another such that an external magnetic field (shown as by the dashed lines) is preferentially on one side of switchable Halbach array 500 in one state of magnetic element 514, and is reduced (or, even, cancelled) on the opposite side of switchable Halbach array 500 in the other state of magnetic element 514. Stated differently, switchable Halbach array 500 may provide an asymmetric external magnetic field depending on the state of switchable Halbach array 500. Note that, in order for switchable Halbach array 500 to form a Halbach array, the magnetic poles of magnetic element 514 may be aligned to form an external magnetic field that is perpendicular with respect to the external magnetic field of magnetic element 510 and magnetic element 512. In particular, the polarities of remnant magnetization of the first magnetic material in magnetic elements 510 and 512 may be perpendicular to a plane 508 of switchable Halbach array 500 and may be opposite to each other. In addition, the polarity of the magnetic material in magnetic element 514 may be in plane 508.

Figure 6:
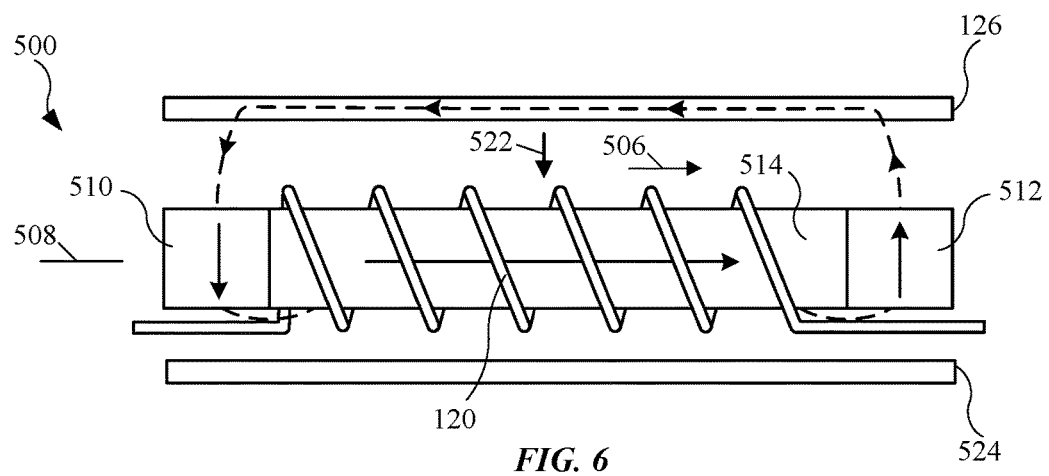
FIG. 6 is a drawing of an example of the switchable Halbach array of FIG. 5.

FIG. 6 illustrates a side view of switchable Halbach array 500, further showing a wire or coil 120 at least partially surrounding or enclosing magnetic element 514. When at least a current pulse is applied to coil 120 by drive circuit 320 (FIG. 4), coil 120 may generate a magnetic field to change the external magnetic field of switchable Halbach array 500. Note that the external magnetic field generated by switchable Halbach array 500 may produce an attractive force 522 between switchable Halbach array 500 and attraction plate 126.

Figure 7:
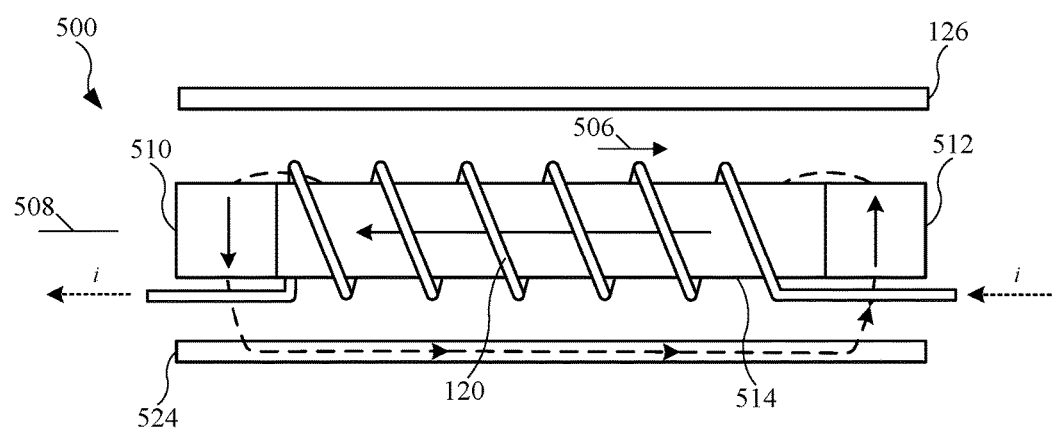
FIG. 7 is a drawing of an example of the switchable Halbach array of FIG. 5.

FIG. 7 illustrates a side view of switchable Halbach array 500 showing how the external magnetic field of switchable Halbach array 500 reverses. In particular, by applying an electrical current i from drive circuit 320 (FIG. 4) to coil 120, the resulting magnetic field produced by coil 120 may reverse direction 506 or polarity of the hard magnetic material in magnetic element 514. (Alternatively, the magnetic field produced by coil 120 may demagnetize the magnetic material in magnetic element 514.) Consequently, the external magnetic field of switchable Halbach array 500 may reverse direction 506, and may be largely located on the opposite side of switchable Halbach array 500, such that the magnetic coupling between switchable Halbach array 500 and attraction plate 126 may be reduced or eliminated.

In some embodiments, switchable Halbach array 500 includes an optional magnetic shunt 524 (such as a soft magnetic material, e.g., soft iron). In these embodiments, the reversed external magnetic field may pass through optional magnetic shunt 524. Moreover, optional magnetic shunt 524 may contain the external magnetic field, thereby largely preventing the external magnetic field from extending beyond optional magnetic shunt 524 and, thus, from inadvertently affecting components and devices that are sensitive to external magnetic fields. Alternatively or additionally, optional magnetic shunt 524 may be used for engaging a mechanism or a relay.

Figure 8:
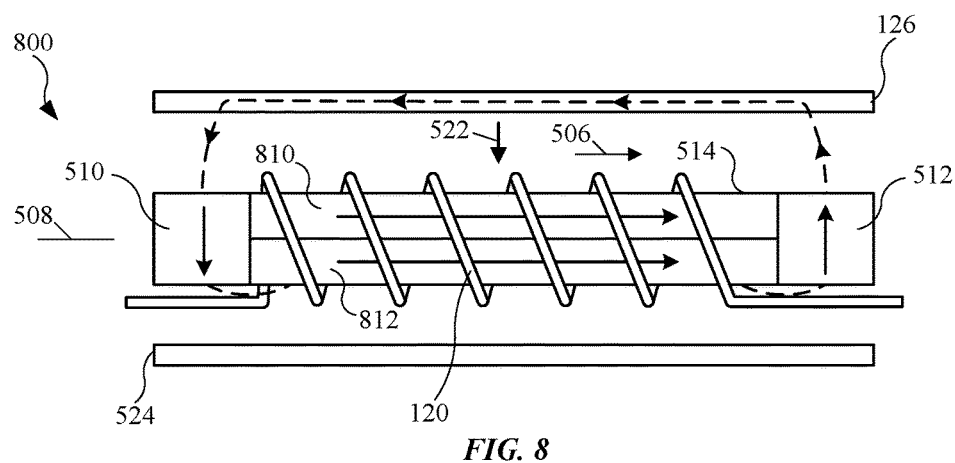
FIG. 8 is a drawing of a modified switchable Halbach array.
Figure 9:
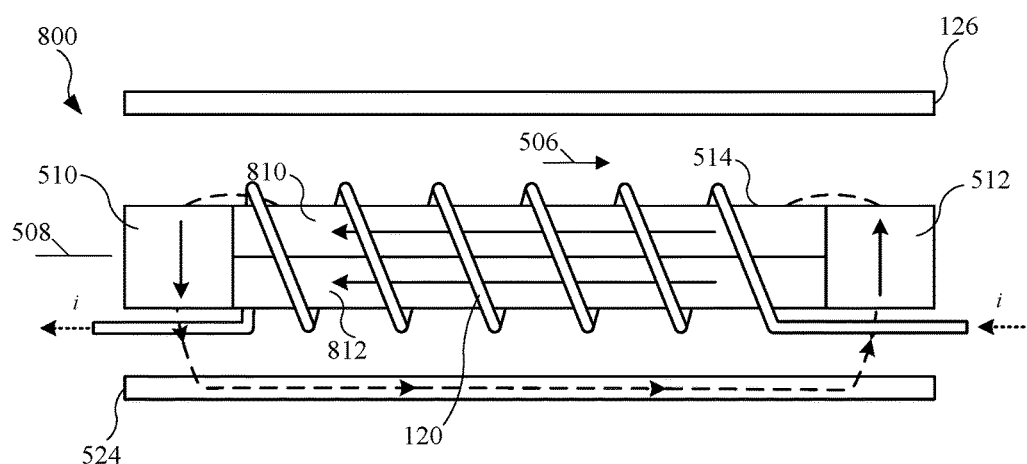
FIG. 9 is a drawing of an example of the modified switchable Halbach array of FIG. 8.

In some embodiments, the magnetic flux in switchable Halbach array 500 is largely confined to a lower portion of magnetic element 514. This is magnetically inefficient. In order to address this challenge, magnetic element 514 may include two layers. This is shown in FIG. 8, which presents a drawing of a modified switchable Halbach array 800. In particular, magnetic element 514 may include magnetic layer 810 and magnetic layer 812. While both of these layers may include a hard magnetic material that has a low coercivity, the magnetic material in magnetic layer 810 may have a higher coercivity than the magnetic material in magnetic layer 812. (However, in other embodiments, magnetic layers 810 and 812 have the same coercivity.) As shown in FIG. 9, magnetic layers 810 and 812 may help ensure that the direction of the remnant magnetization is fully reversed when at least the current pulse is applied to coil 120. This architecture may be used because the flux at magnetic layer 810 may be larger and it can be used to switch magnetic layer 812 into an 'off' polarity even when there is a gap between magnetic layers 810 and 812. Note that this architecture may be used in other geometries besides Halbach arrays.

In some embodiments, magnetic layer 810 includes AlNiCo8 with a coercivity of, e.g., 0.19 T, and magnetic layer 812 includes AlNiCo5 with a coercivity of, e.g., 0.06 Oe.

Note that the architecture shown in FIGS. 7 and 8 may increase the strength of the attractive force at the attraction plate by, e.g., 20%, at the cost of requiring higher currents in coil 120 to reverse the direction of the remnant magnetization in magnetic layer 812.

The amount of electric current needed to change the polarity of the second magnetic material can be a limitation in some electronic devices. For example, in switchable magnet array 100 of FIGS. 1 and 2, coil 120 may need to generate a sufficient magnetic field strength to reverse the polarity of the second magnetic material (such as 2× the second coercivity). In addition, when turning on switchable magnet array 100, the magnetic field from coil 120 may need to counteract the magnetic flux from the first magnetic material. While the magnetic flux from magnetic elements 510 and 512 is reduced in switchable Halbach array 500 in FIGS. 5-7, the polarity of the second magnetic material in magnetic element 514 still needs to be reversed.

In order to address this challenge, a switchable magnet array may be designed using a low coercivity. This architecture may only require coil 120 to generate sufficient magnetic field strength to demagnetize the magnetic material (such as a magnetic field approximately equal to the low coercivity). This architecture may allow the attractive force in the off state to be effectively zero, at the cost of a reduce attractive force in the on state relative to some of the other embodiments. However, in other embodiments, hard magnetic materials may be used in the switchable magnet array.

Figure 10:
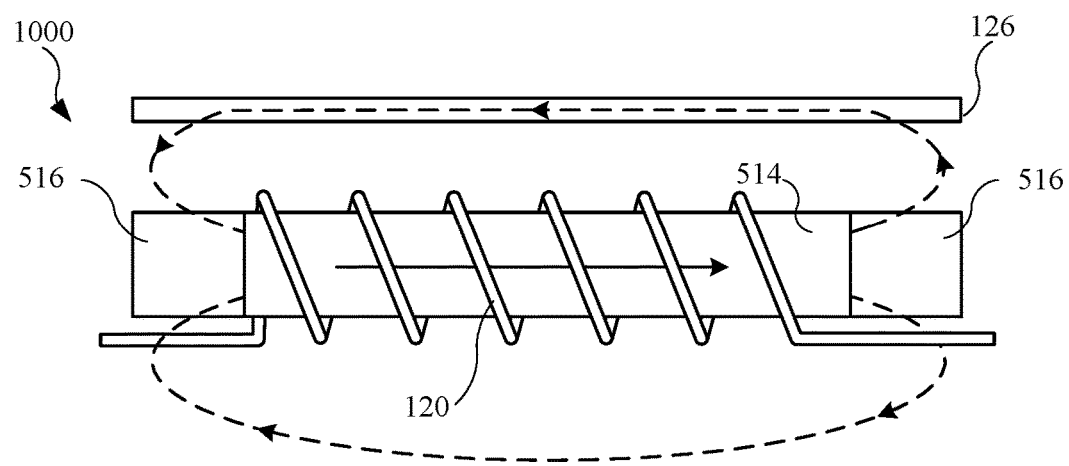
FIG. 10 is a drawing of an example of the low-coercivity switchable magnet array.

FIG. 10 presents a drawing of an example of the low-coercivity switchable magnet array 1000 with magnetic element 514 separated by pole pieces 516. Moreover, FIG. 11 presents a drawing of an example of the low-coercivity switchable magnet array 1000 after magnetic element 514 has been demagnetized.

Figure 12:
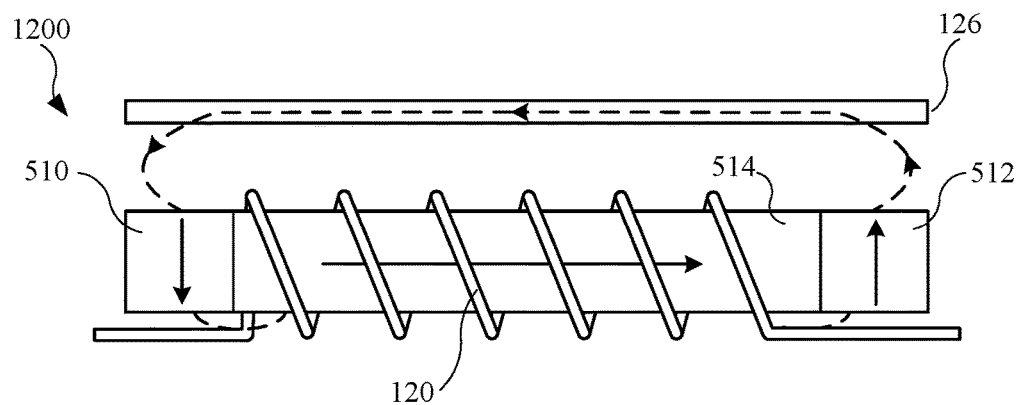
FIG. 12 is a drawing of an example of the low-coercivity switchable Halbach array.

Alternatively, in some embodiments a switchable Halbach array may include only the second magnetic material. This is shown in FIG. 12, which presents a drawing of an example of the low-coercivity switchable Halbach array 1200. In switchable Halbach array 1200, magnetic elements 510, 512 and 514 all include the second magnetic material. Note that this architecture may provide less attractive force for the same volume.

Figure 11:
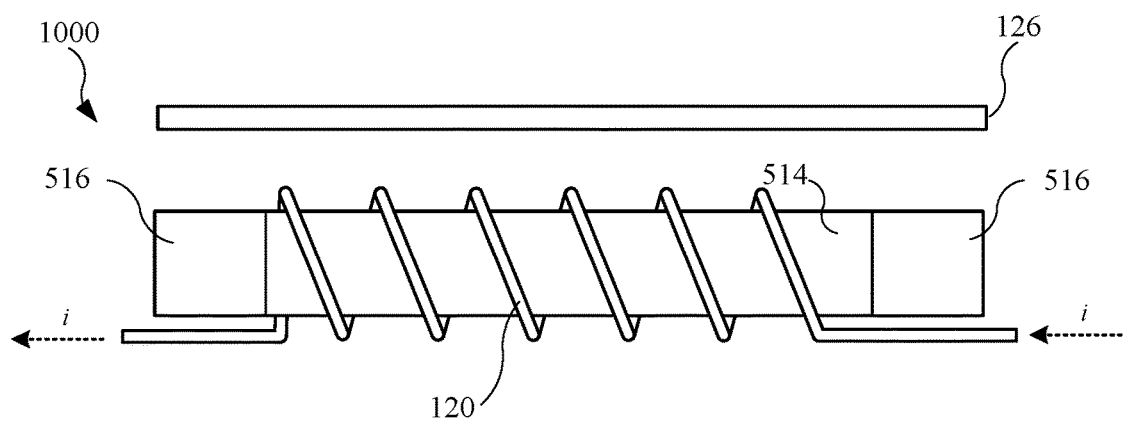
FIG. 11 is a drawing of an example of the low-coercivity switchable magnet array of FIG. 10.
Figure 13:
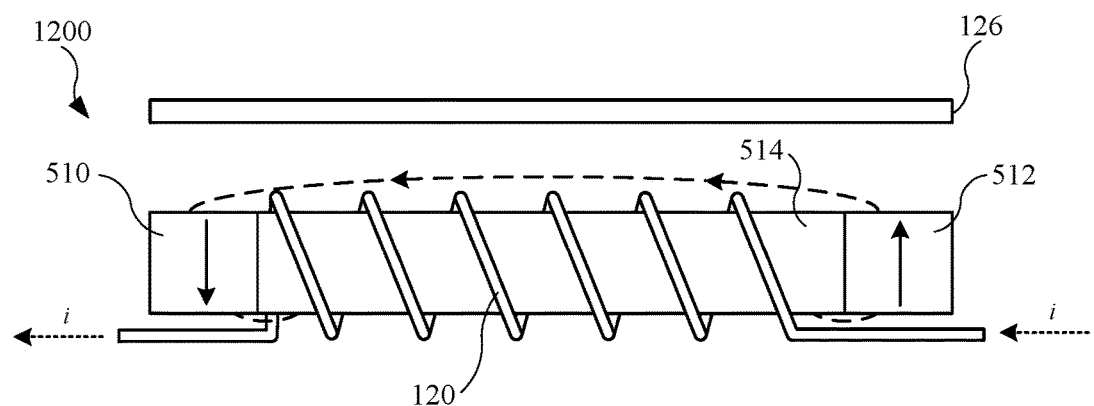
FIG. 13 is a drawing of an example of the low-coercivity switchable Halbach array of FIG. 12.

As with the embodiments shown in FIGS. 10 and 11, the direction of the third remnant magnetization in magnetic element 514 in switchable Halbach array 1200 does not need to be reversed in order to change the state of switchable Halbach array 1200. Instead, magnetic element 514 may be demagnetized to achieve the off state. However, because magnetic elements 510 and 512 may not be demagnetized, it may not be possible to reach zero attractive force. FIG. 13 presents a drawing of an example of the low-coercivity switchable Halbach array 1200 after magnetic element 514 is demagnetized.

While the preceding embodiments illustrated the use of the second magnetic material, in other embodiments the first magnetic material may be used throughout switchable magnet array 1000 (FIGS. 10 and 11) and/or switchable Halbach array 1200. This architecture will require higher magnetic fields to switch the direction of the remnant magnetization. However, the attractive force may be increased.

In some embodiments, the state of a switchable Halbach array or a switchable magnet array (which may both be referred to as a switchable magnet array in this discussion) in an electronic device is changed based on user behavior (such as whether or not a user is touching the electronic device as determined using a touch sensor), a position of the lid, motion of the electronic device (such as based on one or more accelerometers or vibration sensors), a location of the electronic device (such as based on a Global Positioning Sensor, communication with a wireless network, etc.), an orientation of the electronic device (e.g., based on one or more gyroscopes or gravitational field sensors) and/or environmental information as well as information acquired from online resources (such as the Internet). For example, when the electronic device is in a horizontal orientation relative to the ground (such as on a table) and the lid is closed, the switchable magnetic array may be in an off state so that the lid is easily opened. Similarly, when the electronic device is in a horizontal orientation relative to the ground (such as on a table) and the lid is closed, the switchable magnetic array may be in an off state to avoid accidentally demagnetizing a credit card or a hard disk drive.

Alternatively, when the electronic device is in a vertical orientation (relative to the ground) and the lid is closed, the switchable magnetic array may be in an on state so that the lid does not accidentally open. However, if a user tries to open the lid when the electronic device is in this orientation, the switchable magnet array may be turned off. Similarly, when the electronic device is being moved and the lid is closed, the switchable magnetic array may be in an on state so that the lid does not accidentally open. Moreover, if the electronic device falls, the switchable magnet array may be turned on to keep the lid closed and to protect the display and other components.

The ability to selectively turn the switchable magnet array on and off may reduce concerns and constraints associated with leakage magnetic fields on surface of the electronic device. Moreover, when proximate to the switchable magnet array, the magnetic flux may largely be pulled into the attraction plate. Consequently, larger magnetic fields may be selectively produced by the switchable magnet array without concerns about inadvertently damaging other devices or components.

Furthermore, instead of a binary state for the switchable magnetic array, in some embodiments the strength of the attractive force may be adjusted based on the expected forces on the lid (such as based on the orientation, motion of the laptop, etc.). Thus, the switchable magnetic array may be turned partially on (instead of on or off).

Additionally, in some embodiments an electronic device may include at least two instances of the switchable magnetic array. One of the switchable magnetic arrays may provide an attractive force to close or latch the lid. The other switchable magnetic array may provide a repulsive force with a permanent magnet. In conjunction with a torque provided by the hinge, this repulsive force may open the lid.

The switchable magnetic array may be used in a variety of applications. For example, the stand of a desktop computer display can be made adjustable using switchable magnets rather than a clutch or clamp. Moreover, the stand may be able to sense when a user is touching it and may turn off or partly reduce the attractive force holding the stand in place. As the user releases the stand, the switchable magnet array may be turned back on and to hold the stand in its current position.

Furthermore, tablet computers often include magnets to attach accessories. These magnets typically need to be strong, but have very tight leakage constraints and must fit in a small, thin enclosure. The ability to turn the magnets on when an accessory is attached and off otherwise may reduce or eliminate the leakage constraint.

Additionally, portable electronic devices often include compasses. These compasses are usually very sensitive to stray magnetic fields. Typically, when designing these products, extra magnets often are included to cancel these stray magnetic fields at the compass. The ability to turn the switchable magnet arrays off except when need may eliminate the need for these extra compensation magnets.

The preceding embodiments of the switchable magnet array may include fewer components or additional components. Moreover, two or components may be combined into a single component, and/or a position of one or more components may be changed. Note that different layers in the preceding embodiments may include magnetic materials have the same coercivity or different coercivities. For example, some of the magnetic materials may have a lower coercivity than other magnetic materials. This may make it easier for an external conductor or coil to reverse the direction of these magnetic materials.

Figure 14:
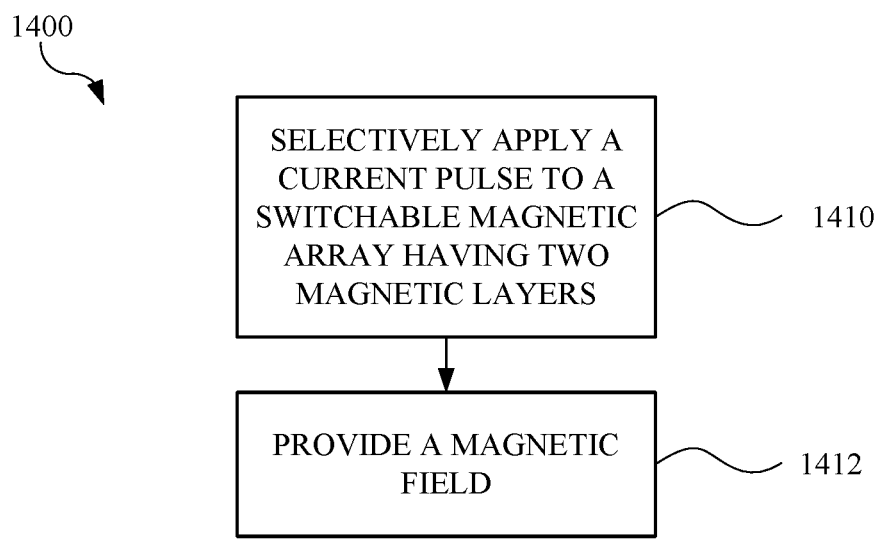
FIG. 14 is a flowchart of an example of a method for selectively latching an electronic device.

We now describe embodiments of a method, which may be performed using one of the preceding embodiments of a switchable magnet array. FIG. 14 presents a flowchart of an example of a method 1400 for selectively latching an electronic device, such as laptop 300 of FIG. 3. During operation, the electronic device selectively applies at least a current pulse (operation 1410) to a conductor to reverse a direction of a second remnant magnetization of a second magnetic material in a second magnetic layer in a switchable magnet array in the base. The switchable magnet array may include: a first magnetic layer that includes a first magnetic material having a first coercivity and that has a first remnant magnetization approximately in a plane of the first magnetic layer; and the second magnetic layer, separated by a gap from the first magnetic layer, which includes the second magnetic material having a second coercivity and having the second remnant magnetization approximately in a plane of the second magnetic layer.

Then, the electronic device may provide an external magnetic field (operation 1412) using the switchable magnet array at an attraction plate in the lid to generate an attractive force that latches the lid and the base when the lid and the base are in proximity to each other.

Figure 15:
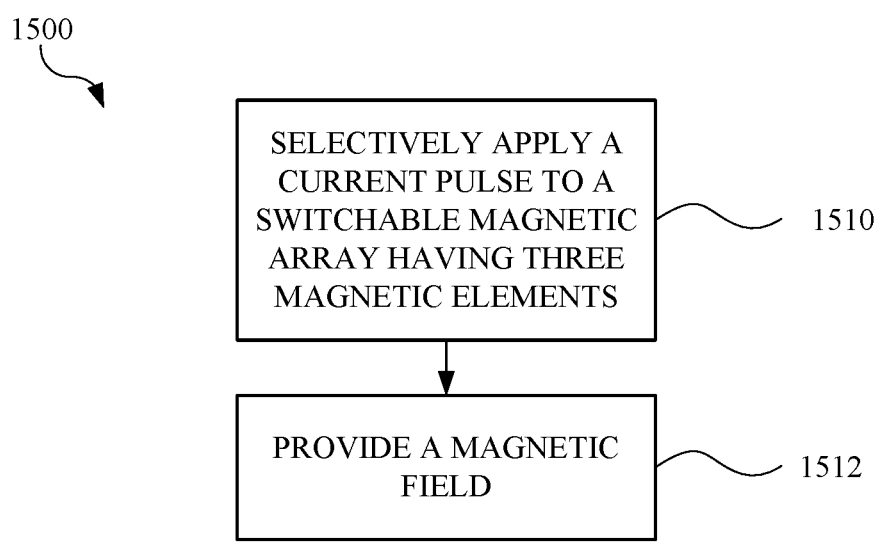
FIG. 15 is a flowchart of an example of a method for selectively latching an electronic device.

FIG. 15 presents a flowchart of an example of a method 1500 for selectively latching an electronic device, such as laptop 300 of FIG. 3. During operation, the electronic device selectively applies at least a current pulse (operation 1510) to a conductor to reverse a direction of a third remnant magnetization of a second magnetic material in a third magnetic element in a switchable magnet array in the base. The switchable magnet array may include: a first magnetic element that includes a first magnetic material having a first coercivity and that has a first remnant magnetization approximately perpendicular to a plane of the switchable magnet array; a second magnetic element that includes the first magnetic material having a second remnant magnetization approximately perpendicular to the plane and in an opposite direction than the first remnant magnetization; and the third magnetic element that includes the second magnetic material having a second coercivity and that has the third remnant magnetization in the plane.

Then, the electronic device may provide an external magnetic field (operation 1512) using the switchable magnet array at an attraction plate in the lid to generate an attractive force that latches the lid and the base when the lid and the base are in proximity to each other.

In some embodiments of methods 1400 (FIG. 14) and/or 1500 there may be additional or fewer operations. Moreover, the order of the operations may be changed, and/or two or more operations may be combined into a single operation.

Figure 16:
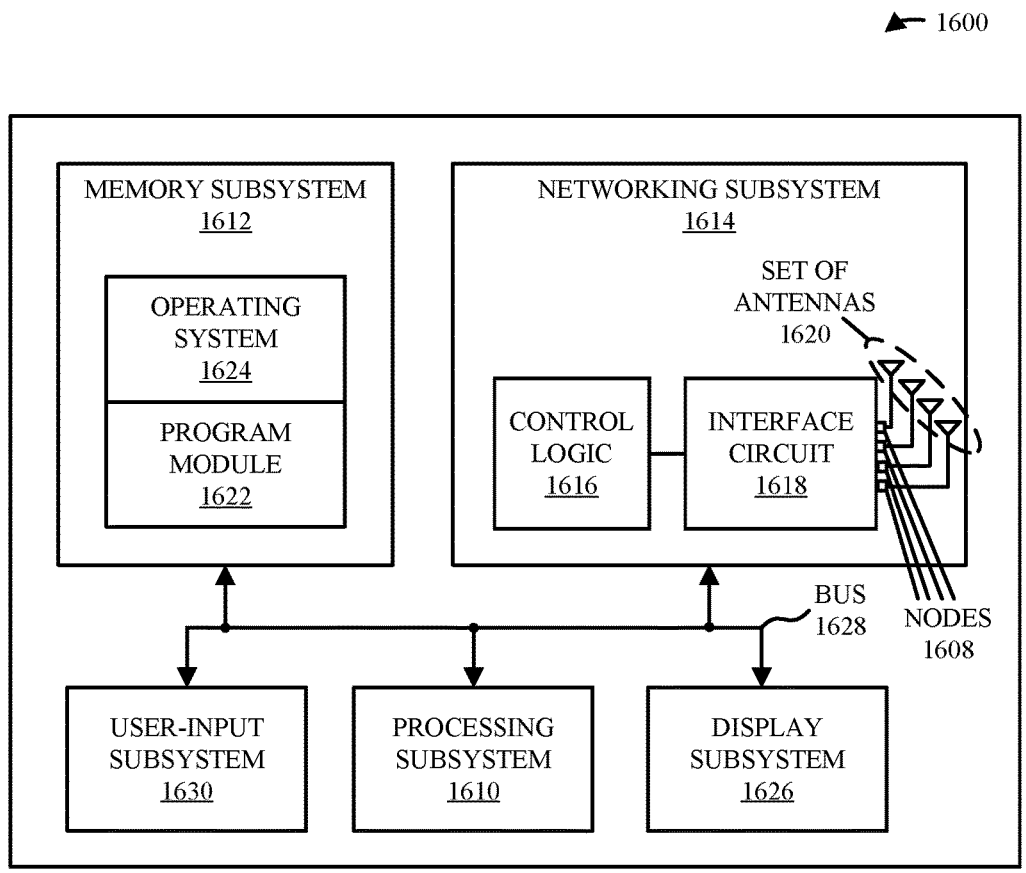
FIG. 16 is a block diagram illustrating an example electronic device, such as the laptop computer of FIG. 3.

We now further describe embodiments of the electronic device. FIG. 16 is a block diagram illustrating an example electronic device 1600, such as laptop computer 300 of FIG. 3. This electronic device includes processing subsystem 1610 (which is sometimes referred to as 'processing logic' or a 'means for processing'), memory subsystem 1612, and networking subsystem 1614. Processing subsystem 1610 includes one or more devices configured to perform computational operations. For example, processing subsystem 1610 can include one or more microprocessors, application-specific integrated circuits (ASICs), microcontrollers, programmable-logic devices, and/or one or more digital signal processors (DSPs).

Memory subsystem 1612 includes one or more devices for storing data and/or instructions for processing subsystem 1610 and networking subsystem 1614. For example, memory subsystem 1612 can include dynamic random access memory (DRAM), static random access memory (SRAM), a read-only memory (ROM), flash memory, and/or other types of memory. In some embodiments, instructions for processing subsystem 1610 in memory subsystem 1612 include: one or more program modules or sets of instructions (such as program module 1622 or operating system 1624), which may be executed by processing subsystem 1610. For example, a ROM can store programs, utilities or processes to be executed in a non-volatile manner, and DRAM can provide volatile data storage, and may store instructions related to the operation of electronic device 1600. Note that the one or more computer programs may constitute a computer-program mechanism, a computer-readable storage medium or software. Moreover, instructions in the various modules in memory subsystem 1612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1610. In some embodiments, the one or more computer programs are distributed over a network-coupled computer system so that the one or more computer programs are stored and executed in a distributed manner.

In addition, memory subsystem 1612 can include mechanisms for controlling access to the memory. In some embodiments, memory subsystem 1612 includes a memory hierarchy that comprises one or more caches coupled to a memory in electronic device 1600. In some of these embodiments, one or more of the caches is located in processing subsystem 1610.

In some embodiments, memory subsystem 1612 is coupled to one or more high-capacity mass-storage devices (not shown). For example, memory subsystem 1612 can be coupled to a magnetic or optical drive, a solid-state drive, or another type of mass-storage device. In these embodiments, memory subsystem 1612 can be used by electronic device 1600 as fast-access storage for often-used data, while the mass-storage device is used to store less frequently used data.

Networking subsystem 1614 includes one or more devices configured to couple to and communicate on a wired and/or wireless network (i.e., to perform network operations), including: control logic 1616, an interface circuit 1618 (which is sometimes referred to as a 'communication circuit') and a set of antennas 1620 (or antenna elements). These antennas may be included inside of a cavity (defined by an inner surface of an external housing or case) or an internal volume of electronic device 1600. In some embodiments, set of antennas 1620 includes an adaptive array that can be selectively turned on and/or off by control logic 1616 to create a variety of optional antenna patterns or 'beam patterns.' (While FIG. 16 includes set of antennas 1620, in some embodiments electronic device 1600 includes one or more nodes, such as nodes 1608, e.g., a pad, which can be coupled to set of antennas 1620. Thus, electronic device 1600 may or may not include set of antennas 1620.) For example, networking subsystem 1614 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Within electronic device 1600, processing subsystem 1610, memory subsystem 1612, and networking subsystem 1614 are coupled together using bus 1628 that facilitates data transfer between these components. Bus 1628 may include an electrical, optical, and/or electro-optical connection that the subsystems can use to communicate commands and data among one another. Although only one bus 1628 is shown for clarity, different embodiments can include a different number or configuration of electrical, optical, and/or electro-optical connections among the subsystems.

In some embodiments, electronic device 1600 includes a display subsystem 1626 for displaying information on a display, which may include a display driver and the display, such as a liquid-crystal display, a multi-touch touchscreen, etc. Display subsystem 1626 may be controlled by processing subsystem 1610 to display information to a user (e.g., information relating to incoming, outgoing, or an active communication session).

Electronic device 1600 can also include a user-input subsystem 1630 that allows a user of the electronic device 1600 to interact with electronic device 1600. For example, user-input subsystem 1630 can take a variety of forms, such as: a button, keypad, dial, touch screen, audio input interface, visual/image capture input interface, input in the form of sensor data, etc.

Electronic device 1600 can be (or can be included in) any electronic device with at least one network interface. For example, electronic device 1600 may include: a cellular telephone or a smartphone, a wireless device, a mobile device, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1600, in alternative embodiments, different components and/or subsystems may be present in electronic device 1600. For example, electronic device 1600 may include one or more additional processing subsystems, memory subsystems, networking subsystems, and/or display subsystems. Additionally, one or more of the subsystems may not be present in electronic device 1600. Moreover, in some embodiments, electronic device 1600 may include one or more additional subsystems that are not shown in FIG. 16. Also, although separate subsystems are shown in FIG. 16, in some embodiments some or all of a given subsystem or component can be integrated into one or more of the other subsystems or component(s) in electronic device 1600. For example, in some embodiments program module 1622 is included in operating system 1624 and/or control logic 1616 is included in interface circuit 1618.

Moreover, the circuits and components in electronic device 1600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the latching technique may be implemented using program module 1622, operating system 1624 or in firmware in interface circuit 1618.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A switchable magnet array, comprising:
    a first magnetic layer, wherein the first magnetic layer includes:
        a first magnetic material having a first coercivity and that has a first remnant magnetization approximately in a plane of the first magnetic layer;
    a second magnetic layer separated by a gap from the first magnetic layer, wherein the second magnetic layer includes:
        a second magnetic material having a second coercivity and that has a second remnant magnetization approximately in a plane of the second magnetic layer; and
    a conductor, proximate to the second magnetic layer, configured to:
        receive at least a current pulse; and
        generate, based on at least the current pulse, a magnetic field in the second magnetic layer that reverses a direction of the second remnant magnetization, so that an external magnetic field provided by the switchable magnet array is changed,
    wherein, when the second remnant magnetization is in an opposite direction as the first remnant magnetization, the external magnetic field provides an attractive force that is less than a threshold value.

2. The switchable magnet array of claim 1, wherein the conductor includes a coil that, at least in part, surrounds the second magnetic layer.

3. The switchable magnet array of claim 1, wherein, when the second remnant magnetization is in a same direction as the first remnant magnetization, the attractive force is greater than the threshold value.

4. The switchable magnet array of claim 1, wherein the first magnetic material includes neodymium iron boron, and the second magnetic material includes an alloy of aluminum, nickel and cobalt.

5. The switchable magnet array of claim 1, wherein the first magnetic material in the first magnetic layer and the second magnetic material in the second magnetic layer are divided into segments that are separated by another magnetic material.

6. The switchable magnet array of claim 1, wherein the gap has a predefined value based on the first magnetic material, the second magnetic material and a geometry of the switchable magnet array.

7. A switchable magnet array, comprising:
a first magnetic layer, wherein the first magnetic layer includes:
a first magnetic material having a first coercivity and that has a first remnant magnetization approximately in a plane of the first magnetic layer;
a second magnetic layer separated by a gap from the first magnetic layer, wherein the second magnetic layer includes:
a second magnetic material having a second coercivity and that has a second remnant magnetization approximately in a plane of the second magnetic layer; and
a conductor, proximate to the second magnetic layer, configured to:
receive at least a current pulse; and
generate, based on at least the current pulse, a magnetic field in the second magnetic layer that reverses a direction of the second remnant magnetization, so that an external magnetic field provided by the switchable magnet array is changed,
wherein the second coercivity is less than the first coercivity.

8. The switchable magnet array of claim 7, wherein the conductor includes a coil that, at least in part, surrounds the second magnetic layer.

9. The switchable magnet array of claim 7, wherein, when the second remnant magnetization is in a same direction as the first remnant magnetization, the attractive force is greater than a threshold value.

10. The switchable magnet array of claim 7, wherein, when the second remnant magnetization is in an opposite direction as the first remnant magnetization, the attractive force is less than a threshold value.

11. The switchable magnet array of claim 7, wherein the first magnetic material includes neodymium iron boron, and the second magnetic material includes an alloy of aluminum, nickel and cobalt.

12. The switchable magnet array of claim 7, wherein the first magnetic material in the first magnetic layer and the second magnetic material in the second magnetic layer are divided into segments that are separated by another magnetic material.

13. The switchable magnet array of claim 7, wherein the gap has a predefined value based on the first magnetic material, the second magnetic material and a geometry of the switchable magnet array.

14. An electronic device, comprising:
a lid that includes an attraction plate;
a base, rotatably mechanically coupled to a lid, that includes a drive circuit and a switchable magnet array, the switchable magnet array comprising:
a first magnetic layer, wherein the first magnetic layer includes:
a first magnetic material having a first coercivity and that has a first remnant magnetization approximately in a plane of the first magnetic layer;
a second magnetic layer separated by a gap from the first magnetic layer, wherein the second magnetic layer includes:
a second magnetic material having a second coercivity and that has a second remnant magnetization approximately in a plane of the second magnetic layer; and
a conductor, proximate to the second magnetic layer, configured to:
receive at least a current pulse; and
generate, based on at least the current pulse, a magnetic field in the second magnetic layer that reverses a direction of the second remnant magnetization to selectively provide an attractive force with the attraction plate to latch the lid and the base when the lid and the base are in proximity to each other,
wherein, when the second remnant magnetization is in an opposite direction as the first remnant magnetization, the attractive force is less than a threshold value.

15. The electronic device of claim 14, wherein, when the second remnant magnetization is in a same direction as the first remnant magnetization, the attractive force is greater than the threshold value.

16. The electronic device of claim 14, wherein the conductor includes a coil that, at least in part, surrounds the second magnetic layer.

17. The electronic device of claim 14, wherein the first magnetic material includes neodymium iron boron, and the second magnetic material includes an alloy of aluminum, nickel and cobalt.

18. The electronic device of claim 14, wherein the first magnetic material in the first magnetic layer and the second magnetic material in the second magnetic layer are divided into segments that are separated by another magnetic material.

19. The electronic device of claim 14, wherein the gap has a predefined value based on the first magnetic material, the second magnetic material and a geometry of the switchable magnet array.

* * * * *